(12) United States Patent
Nakahama et al.

(10) Patent No.: US 7,737,270 B2
(45) Date of Patent: Jun. 15, 2010

(54) METHOD FOR PRODUCING A PIGMENT

(75) Inventors: Kazumichi Nakahama, Tokyo (JP); Yukio Hanyu, Isehara (JP); Takayuki Teshima, Yokohama (JP); Akira Kuriyama, Atsugi (JP); Toshihiko Hiaki, Tokyo (JP); Kiwamu Sue, Tokyo (JP); Hayato Hattori, Tokyo (JP); Hironori Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 12/019,209

(22) Filed: Jan. 24, 2008

(65) Prior Publication Data

US 2008/0182984 A1 Jul. 31, 2008

(30) Foreign Application Priority Data

Jan. 25, 2007 (JP) ............................. 2007-015536

(51) Int. Cl.
C04B 14/00 (2006.01)
C07B 47/00 (2006.01)
C07D 487/22 (2006.01)

(52) U.S. Cl. ...................................... 540/145; 106/400

(58) Field of Classification Search .................. 540/145; 106/400

See application file for complete search history.

(56) References Cited

FOREIGN PATENT DOCUMENTS

JP 05-179153 7/1993
JP 07-316448 12/1995

OTHER PUBLICATIONS

Guy et al., "Stnthesis of Phtalocyanines . . . ", Chem. Commumn., (1997).*

* cited by examiner

*Primary Examiner*—James O. Wilson
*Assistant Examiner*—Paul V. Ward
(74) *Attorney, Agent, or Firm*—Canon U.S.A., Inc., IP Division

(57) ABSTRACT

Provided is a method for producing a pigment, in particular, a metal phthalocyanine, in high yield and in a green process. The method has (1) a step of obtaining a solution mixture by mixing at least one type of compound serving as a raw material for a pigment with a solvent, and (2) a step of obtaining the pigment by reacting the compound while holding the solution mixture at not less than a temperature where a subcritical state or a supercritical state of the solvent occurs.

5 Claims, No Drawings

METHOD FOR PRODUCING A PIGMENT

BACKGROUND OF THE INVENTION

1. Field of the Invention

The present invention relates to a method for producing a pigment, and particularly, to a method for producing a pigment represented by a metal phthalocyanine, which is useful as a coloring material and for use in electrophotograph and other fields, with high yield and in an environmentally friendly process (hereinafter, referred to as a "green process").

2. Description of the Related Art

As a conventional method for producing a pigment, in particular, a metal phthalocyanine, the Wyler method and the phthalonitrile method have been most frequently employed in the industrial field.

In the Wyler method, a pigment is synthesized by heating phthalic anhydride, a metal compound and urea in an inert solvent in the presence of a catalyst. On the other hand, in the phthalonitrile method, a pigment is synthesized by heating a phthalocyanine and a metal or a metal salt in a solvent.

The Wyler method has the following problem. The reaction does not proceed uniformly because all of a raw-material mixture, reaction intermediate and product are not completely dissolved in a reaction process. Consequently, the product is not obtained with high purity or in high yield. In addition, since an organic solvent such as an alkylbenzene is used as a reaction solvent, this method is not desirable in view of environmental load.

Unlike the Wyler method, in the phthalonitrile method, a metal phthalocyanine can be synthesized with high purity and in high yield. However, the reaction must be performed at a sufficient high temperature and in a solvent, which is capable of dissolving raw material such as phthalonitrile and a reaction intermediate sufficiently. Therefore, a solvent such as an alkylbenzene having a high-boiling point is often used. However, it is not desirable to use such a solvent because separation of the solvent from a product is difficult and environmental load increases.

Japanese Patent Application Laid-Open No. H07-316448 is concerned with the Wyler method and discloses that a product can be obtained in high yield by adding a predetermined additive in a reaction process to disperse raw materials, thereby increasing a reaction rate. On the other hand, Japanese Patent Application Laid-Open No. H05-179153 is concerned with the phthalonitrile method. In this method, a low boiling-point alkylbenzene having a branched C6 side chain is used as a solvent. By virtue of this, the publication of Japanese Patent Application Laid-Open No. H05-179153 discloses that a product can be obtained in high yield by improving the solubility of the raw materials, thereby increasing a reaction rate, and that the solvent can be removed from the product by a simple operation such as removal under reduced pressure.

Nevertheless, in both methods disclosed in Japanese Patent Application Laid-Open Nos. H07-316448 and H05-179153, there is room for improvement. More specifically, an environmentally unfriendly organic solvent, such as an alkylbenzene used as a reaction solvent, is susceptible to improvement. In the circumstances, it has been desired to develop a method for synthesizing a high-purity metal phthalocyanine with high yield and in a green process.

Note that the term "environmentally friendly process" in the present invention means a process that does not discharge harmful wastewater and the like causing environmental pollution as much as possible.

SUMMARY OF THE INVENTION

The present invention has been achieved in view of the background mentioned above and is directed to providing a method for producing a pigment, in particular, a metal phthalocyanine, with high yield and in a green process.

The method for producing a pigment provided by the present invention is characterized by including (1) a step of obtaining a solution mixture by mixing at least one type of compound serving as a raw material for a pigment with a solvent, and (2) a step of obtaining the pigment by reacting the compound while holding the solution mixture at not less than a temperature where a subcritical state or a supercritical state of the solvent occurs.

As the solvent, ethanol is desirably used.

The pigment is desirably a metal phthalocyanine.

The metal phthalocyanine is desirably copper phthalocyanine or titanyl phthalocyanine.

A dispersant is desirably used at least one of steps (1) and (2).

As the dispersant, a polymer dispersant is desirably used.

The method for producing a pigment of the present invention includes a method for synthesizing a pigment by chemically reacting a plurality of raw materials with each other.

According to the present invention, it is possible to provide a method for producing a pigment such as a metal phthalocyanine with high yield and in a green process.

Further features of the present invention will become apparent from the following description of exemplary embodiments.

DESCRIPTION OF THE EMBODIMENTS

The present invention will be more specifically described below.

A method for producing a pigment according to the present invention is a method for producing a pigment, which is characterized by including (1) a step of obtaining a solution mixture by mixing at least one type of compound serving as a raw material for a pigment with a solvent, and (2) a step of obtaining the pigment by reacting the compound while holding the solution mixture at not less than a temperature where a subcritical state or a supercritical state of the solvent occurs.

To synthesize a highly-pure pigment with high yield, it is necessary to perform a reaction at a sufficiently high temperature and uniformly dissolve raw material(s) and a reaction intermediate in a solvent. Then, the present inventors have come to propose the present invention characterized in that a pigment is chemically synthesized from the raw material(s) thereof in a subcritical state or a supercritical state of a solvent.

Generally, it is impossible to estimate whether the solubility of a substance to a solvent is improved or not in high-temperature/high-pressure conditions such as a subcritical or supercritical state of the solvent compared to that in normal temperature/normal pressure conditions. This is because physical properties exerting an influence on the solubility, such as a dielectric constant, change.

However, the present inventors experimentally found that the subcritical and supercritical states of a solvent are extremely useful for improving the solubility of a raw material(s) to a solvent, as described below.

For example, when ethanol (critical temperature: 513.9 (K)) is used as a solvent, the solubility of a raw material(s) for a pigment is satisfactory in a subcritical state, which is a high density region in a temperature range slightly lower than the critical temperature.

The present inventors experimentally confirmed that the solubility is significantly improved more in a supercritical state. In addition, since the boundary surface between a gas phase and a liquid phase disappears in the supercritical state, the uniformity of a solvent in a reaction vessel can be improved. As a result, the yield of a pigment as a product can be significantly improved.

Furthermore, the supercritical state is advantageous. Since the gas-phase/liquid phase boundary disappears, a maximum dissolution amount of a raw material(s) per unit volume of a vessel increases. For this reason, a pigment can be synthesized from a raw material(s) dissolved in a higher concentration(s) in the supercritical state than in the subcritical state, with the result that production is carried out in a green process and productivity improves.

As is apparent from the description above, the present invention is characterized in that a pigment is chemically synthesized from a raw material(s) of the pigment in the subcritical state or supercritical state of a solvent. The present invention can be more efficiently carried out in the supercritical state of a solvent.

The present invention will mainly deal with production of a metal phthalocyanine as a pigment; however, the present invention is also useful for producing pigments other than metal phthalocyanines by the reason that the subcritical and supercritical states are extremely useful for improving the solubility of a raw material(s) to a solvent.

In the present invention, the supercritical state is defined as the state occurring in a temperature region of not less than the critical temperature of a solvent. The solvent at the critical temperature or more has a characteristic in that it is not liquefied even under pressurized conditions and forms a uniform phase.

On the other hand, the subcritical state (the concept of subcritical is ambiguous) is defined as the state occurring in a region where the temperature is not less than the boiling point of a solvent and a pressure of 1.013 (MPa) or more, in the present invention, as is defined in Japanese Patent Application Laid-Open No. 2002-187954.

In the subcritical state, the temperature is desirably not less than the boiling point of a solvent+50 (K) and a pressure is 1.520 (MPa) or more. Particularly when ethanol is used as a solvent, the subcritical state occurs in the range where a temperature is 423 (K) or more and a pressure is 2.026 (MPa) or more, and desirably, in the range where a temperature of 473 (K) or more and pressure is 2.026 (MPa) or more and 6.140 (MPa) or less.

Next, pigments and raw materials thereof according to the present invention will be described.

A compound constituting a pigment according to the present invention includes its derivatives unless otherwise specified. To describe more specifically, a metal phthalocyanine and a metal phthalocyanine derivative are collectively referred to as a metal phthalocyanine. However, it should be noted that compounds constituting pigments and raw materials thereof used in Examples do not include their derivatives.

In the first place, a pigment according to the present invention will be described.

A pigment according to the present invention is a coloring material, which is insoluble in a solvent at normal temperature and normal pressure.

A pigment according to the present invention may be used, for example, in near-infrared light reflection materials, oxidation catalysts, deodorant materials, antibacterial materials, heat-removing materials, smoke elimination/desalt materials, dioxin-suppressive materials, insect-removers and light scattering materials for backlight of liquid crystal panels, fluorescent materials and photoconductive materials. Other than these, a pigment according to the present invention may be used in cosmetics effective in preventing and adsorbing ultraviolet rays; coloring materials such as paint, toner and ink; and organic photosensitive member for electrophotograph. However, the present invention is not limited to these applications.

Examples of inorganic pigments include oxide pigments such as cobalt blue, celsian blue, cobalt violet, cobalt green, zinc white, titanium white, light red, chrome oxide green and Mars black; hydroxide pigments such as viridian, yellow ochre and alumina white; silicate pigments such as ultramarine, talc and white carbon; metal powders such as gold powder, silver powder and bronze powder; and carbon black.

Examples of organic pigments include azo-based pigments such as β-naphthol-based azo pigment, naphthol AS-based azo pigment, monoazo-type or disazo-type acetoacetanilide-based azo pigment, pyrazon-based azo pigment and condensation azo pigment; phthalocyanine-based pigments; subphthalocyanine-based pigments; porphyrin-based pigments; quinacridone-based pigments; isoindoline-based pigments; isoindolinone-based pigments; threne-based pigments; perylene-base pigments; perinone-based pigments; thioindigo-based pigments; dioxazine pigments; quinophthalone-based pigments; diketopyrrolopyrrole-based pigments; and newly synthesized pigments. However, the pigments to be produced by the present invention are not limited to those mentioned above.

The present invention can be more effectively carried out for producing a phthalocyanine, in particular, a metal phthalocyanine, as a pigment. The types of metal phthalocyanines are not particularly limited and various types of metal phthalocyanines can be produced in accordance with the usage thereof.

For example, as the pigment to be applied to a coloring material for ink and toner, etc., copper phthalocyanine is suitably used. As a pigment to be applied to an organic photosensitive member for electrophotograph, titanyl phthalocyanine is suitably used.

When a metal phthalocyanine is produced as a pigment by the present invention, examples of a phthalocyanine will be specifically described below; however, the present invention is not limited to these specific examples.

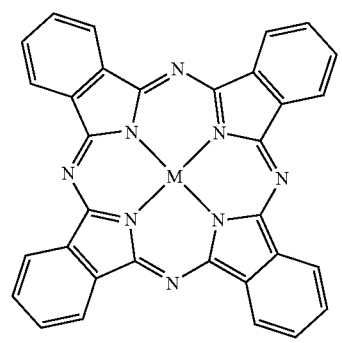

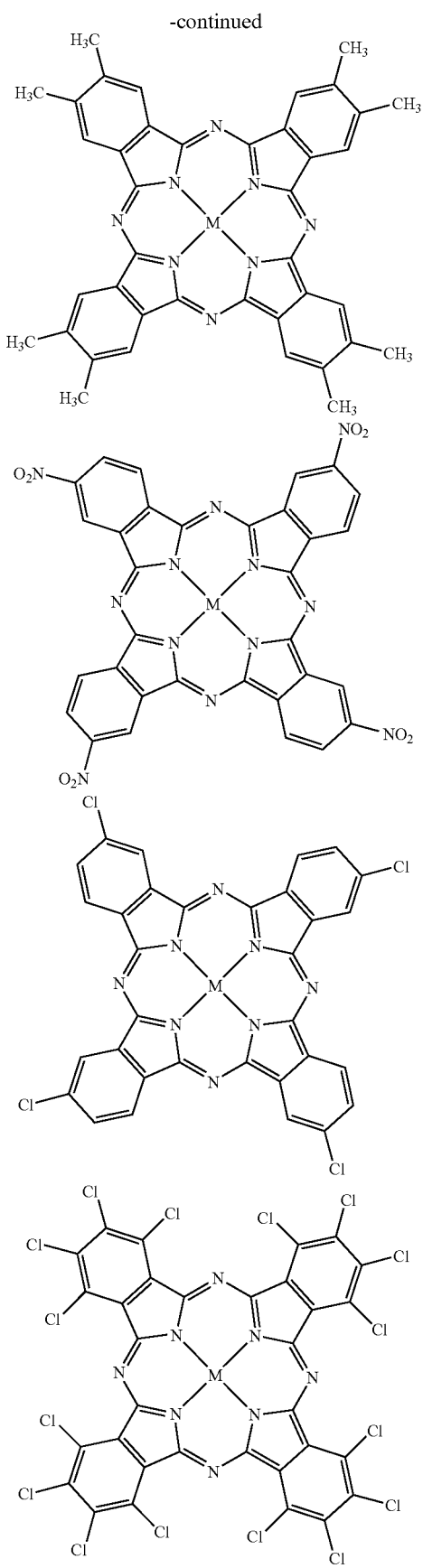
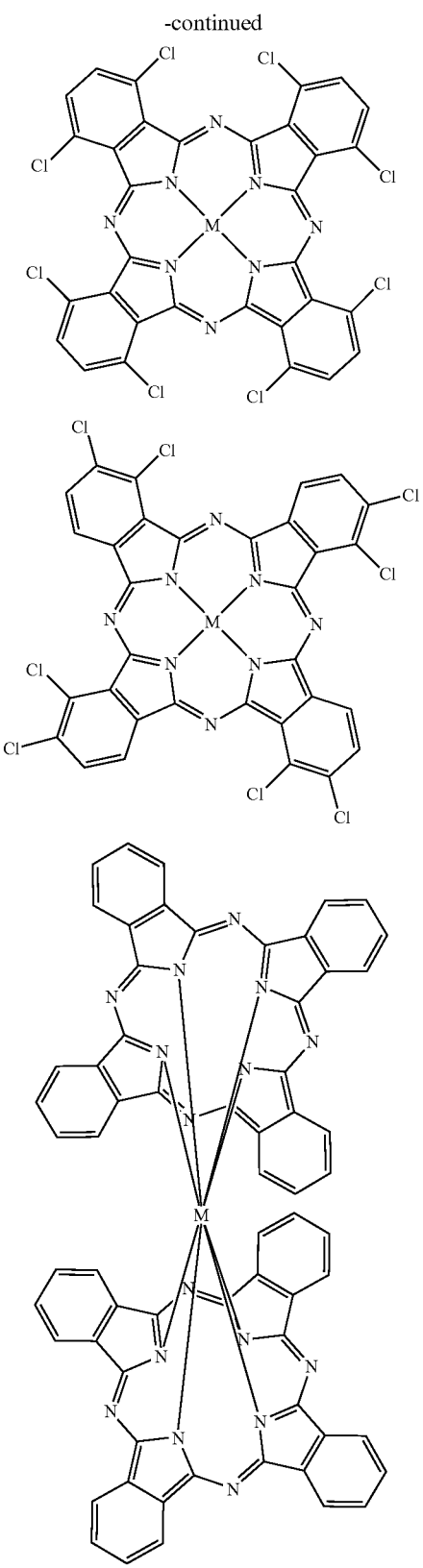
In the formulas, M represents a central metal. Examples of the central metal include Ti, V, Fe, Ru, Os, Co, Ni, Pd, Pt, Cu, Ag, Zn, Cd, Al, Ga, Si and Ce. Depending upon the metal, a single or a plurality of organic molecules or inorganic atoms may be present as an axial ligand(s).

Next, a raw material for a pigment that may be used in the present invention will be described.

The term "raw material for a pigment" used herein refers to a raw-material substance for chemically synthesizing a coloring material constituting a pigment.

Specific examples of the raw-material substance include a diazonium cation-containing compound and an aromatic compound such as a benzene derivative, naphthalene derivative, anthracene derivative in the case of an azo pigment; an indolenine derivative and an aldehyde-containing compound in the case of a cyanine pigment; an indoxyl derivative in the case of an indigo pigment; and a methyleneindoline derivative and a formyl group-containing compound in the case of a spiropyran pigment.

When a phthalocyanine pigment is produced, examples of the raw-material substance thereof include phthalonitrile, a phthalonitrile derivative, diiminoisoindoline derivative, phthalic anhydride derivative, phthalic acid derivative and subphthalocyanine derivative.

Particularly when a metal phthalocyanine is produced, raw materials thereof include a metal source for a desired central metal such as a metal, metal salt or metal alkoxide besides the aforementioned compounds. However, the present invention is not limited to the aforementioned combinations of pigments and raw materials thereof.

When a metal phthalocyanine is produced, examples of raw materials except for a central metal supply source (such as a metal, metal salt, or metal alkoxide) include phthalonitrile, a phthalonitrile derivative, isoindoline derivative, phthalic anhydride derivative, phthalic acid derivative, ortho-bromobenzene derivative, ortho-iodobenzene derivative and subphthalocyanine derivative.

However, in view of reaction yield and reaction temperature, a phthalonitrile derivative, isoindoline derivative and subphthalocyanine derivative are suitably used.

Next, specific examples of phthalonitrile, the phthalonitrile derivative, isoindoline derivative and subphthalocyanine derivative will be described; however, a raw material(s) is not limited to these.

Specific examples of phthalonitrile and the phthalonitrile derivative include

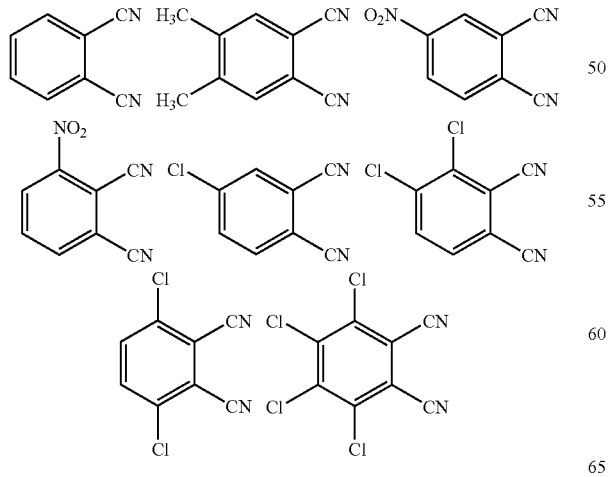

Examples of the diiminoisoindoline derivative include

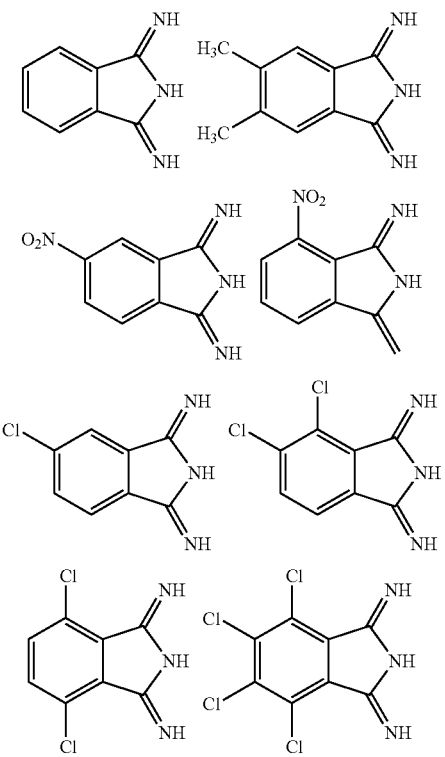

Examples of the subphthalocyanine derivative include

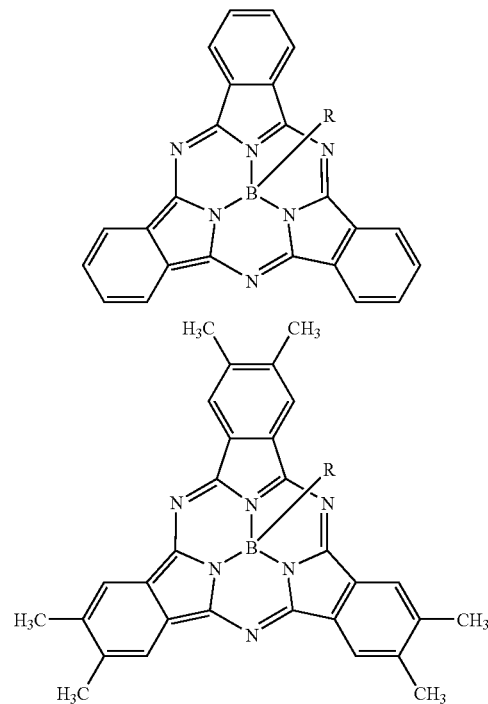

-continued

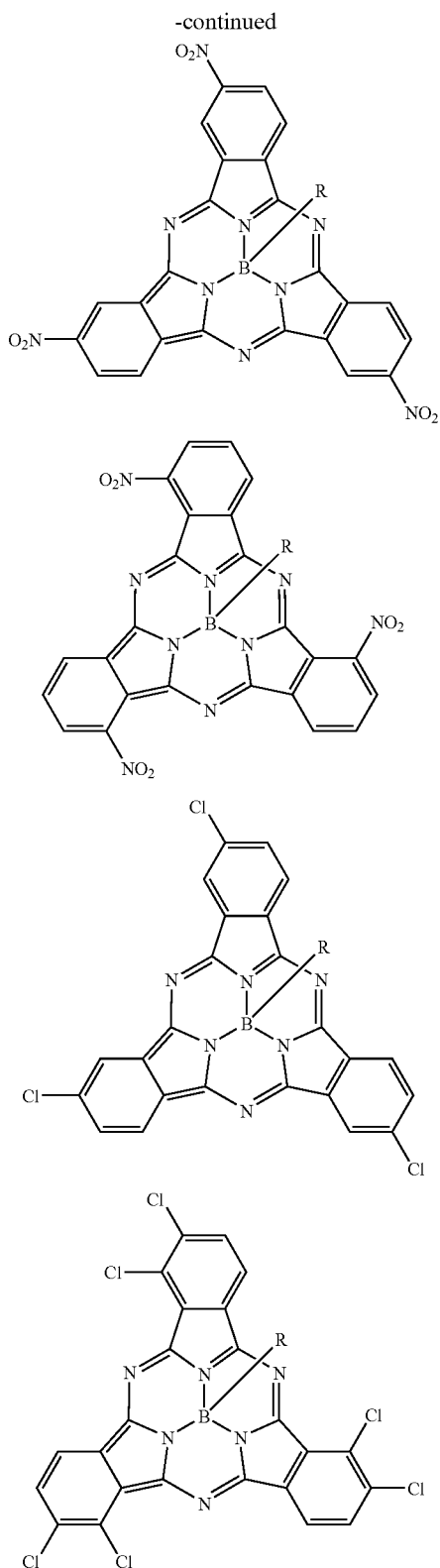

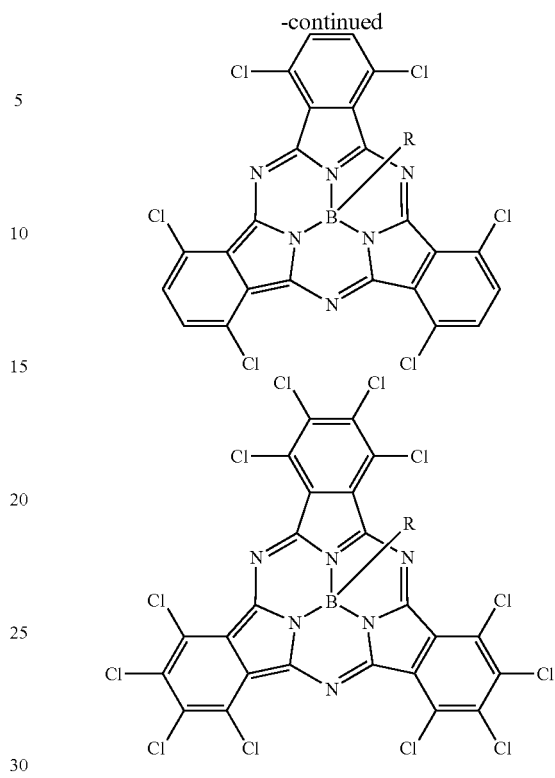

In the formulas of the aforementioned compounds, R represents Cl, Br, I, a benzene ring derivative or an alkyl group such as methyl, ethyl, normal propyl, isopropyl, normal butyl, isobutyl, normal pentyl, normal hexyl, normal heptyl or normal octyl.

A raw material for a pigment according to the present invention may be finely pulverized in advance by use of a commonly known pulverizing/kneading unit such as ultrasonic homogenizer, jet mill, pressure homogenizer, colloid mill, ball mill, sand mill or paint shaker.

When a raw material is finely pulverized, the surface area thereof increases. As a result, solubility, reaction rate and reaction yield are expected to improve. Note that, in the step of finely pulverizing a raw material for a pigment into pieces, a raw material alone or a mixture of a raw material and a solvent can be used.

As a solvent according to the present invention, any solvent may be used as long as the present invention can be carried out.

Examples of the solvent include known solvents such as long-chain or branched alkylbenzene, normal hexane, toluene, xylene, chloroform, tetrahydrofuran, dioxane, ethyl acetate, methylethyl ketone, acetone, acetonitrile, propanol, butanol, N,N-dimethylsulfoxide, ethylene glycol, diethylene glycol, triethylene glycol, N-methyl-2-pyrrolidone, substituted pyrrolidone, triethanolamine, water, methanol, ethanol, isopropanol, normal propanol, N,N-dimethylformamide and dimethylsulfoxide.

These solvents may be used singly or in a mixture of a plurality of different types of the solvents. Of them, ethanol is suitably used in view of the amount of environmental load, boiling point, and yield of a pigment chemically synthesized from a raw material thereof.

When a metal phthalocyanine is synthesized, a catalyst is not essential. However, in a conventional method, it is known that reaction rate and reaction yield significantly decrease in absence of a catalyst.

In contrast, in the method of the present invention for chemically synthesizing a pigment from a raw material(s) in a subcritical or supercritical state of ethanol, a pigment can be obtained in high yield even in the absence of a catalyst although the reason has not yet been elucidated.

Generally, as a catalyst, use may be made of a molybdenum compound such as molybdenum oxide, ammonium molybdate or molybdenum carbonyl, an arsenic compound such as arsenic oxide or boric acid.

In contrast, the present invention in which a pigment can be produced in high yield in the absence of a catalyst has great advantages: a post treatment for a pigment as a product can be performed in a simpler manner and the amount of environmental load derived from the catalyst can be suppressed.

Furthermore, in a production method according to the present invention, a dispersant can be used in at least one of the steps (1) and (2) depending upon a desired product.

In general, when a pigment is used as a coloring material for ink etc., a synthesized pigment must be subjected to a pulverization/kneading step for pulverizing it into pieces by dispersion treatment.

In the present invention, since a dispersant is used in chemically synthesizing a pigment from a raw material(s) thereof, a pigment can be made into pieces simultaneously with synthesis. By virtue of this, in a method for producing a pigment for use in a coloring material, etc., which requires a dispersion treatment process, manufacturing cost can be reduced.

As the dispersant of the present invention, a commonly known dispersant may be used as long as the object of the present invention can be attained.

A compound, as long as it contributes to dispersing a pigment in a solvent, even though it is not generally used as a dispersant in the art, is defined as a dispersant in the broad sense in the present invention.

As such a dispersant, a nonionic surfactant may be mentioned.

Examples of the nonionic surfactant include sorbitan fatty acid esters (such as sorbitan monooleate, sorbitan monolaurate, sorbitan sesquioleate and sorbitantrioleate), polyoxyethylene sorbitan fatty acid esters (such as polyoxyethylene sorbitan monostearate and polyoxyethylene sorbitan monooleate), polyethylene glycol fatty acid esters (such as polyoxyethylene monostearate and polyethylene glycol diisostearate), polyoxyethylene alkylphenyl ethers (such as polyoxyethylene nonylphenyl ether and polyoxyethylene octylphenyl ether) and aliphatic diethanolamide based surfactants. As a polymer dispersant, a polymer compound having a molecular weight of 1000 or more is desirable.

Specific examples of the polymer dispersant include styrene-maleic acid resin, styrene-acrylic resin, rosin, BYK-160, 162, 164, 182 (urethane based polymer compounds manufactured by BYK-Chemie GmbH), EFKA-47, LP-4050 (urethane based dispersant manufactured by EFKA), Solsperse 24000 (polyester based polymer manufactured by Zeneca) and Solsperse 17000 (Aliphatic diethanolamide based polymer manufactured by Zeneca).

To obtain the stability of pigment dispersion, a polymer dispersant is desirably used.

Examples of the polymer dispersants include, in addition to the aforementioned dispersants, random copolymers and graft copolymers each of which is formed of a monomer (such as lauryl methacrylate, stearyl methacrylate, 2-ethylhexyl methacrylate, and cetyl methacrylate and a monomer containing a polar group such as methyl methacrylate, ethyl methacrylate, isopropyl methacrylate, styrene and vinyl toluene.

Examples of the monomer containing a polar group include acidic group monomers such as acrylic acid, methacrylic acid, itaconic acid, fumaric acid, maleic acid, styrene sulfonic acid and alkali salts thereof and basic group monomers such as dimethylaminoethyl methacrylate, diethylaminoethyl methacrylate, vinylpyridine, vinylpyrrolidine, vinylpiperidine and vinyllactam.

Other than these, mention may be made of a styrene-butadiene copolymer, block-copolymer of a styrene and long-chain alkyl methacrylate, and so on.

EXAMPLES

The present invention will be more specifically described by way of examples; however, the present invention is not limited to these examples.

Example 1

Phthalonitrile (2.30 g) and 0.90 g of cuprous chloride were mixed with 90 g of ethanol and placed in a Teflon (registered trademark) cylindrical container and closed tight. The mixture was allowed to react in a molten salt bath for one hour at a temperature of 473.15K and a pressure of 3.2 MPa. In other words, the reaction was performed under the subcritical state of ethanol.

After completion of the reaction, a product was collected by filtration and evaluated by powder X-ray diffractometry. As a result, it was confirmed that copper phthalocyanine was synthesized.

After washed with benzene in an amount of about 10 times larger than the weight of the product and dried, the product was washed sequentially with a 5% aqueous sodium hydroxide solution, warm water, a 5% aqueous hydrochloric acid solution and warm water in this order. This operation was repeated twice and the product was dried.

Subsequently, the dried product was dissolved in a small amount of concentrated sulfuric acid and poured into water to precipitate. The precipitated product was washed with water, collected and dried. As the yield of copper phthalocyanine purified in this manner was obtained, it was confirmed to be 23.2%.

Example 2

Phthalonitrile (2.30 g) and 0.90 g of cuprous chloride were mixed with 90 g of ethanol and placed in a Teflon (registered trademark) cylindrical container and closed tight. The mixture was allowed to react in a molten salt bath for one hour at a temperature of 523.15K and a pressure of 8.0 MPa. In other words, the reaction was performed under the supercritical state of ethanol.

After completion of the reaction, a product was collected by filtration and evaluated by powder X-ray diffractometry. As a result, it was confirmed that copper phthalocyanine was synthesized.

After washed with benzene in an amount of about 10 times larger than the weight of product and dried, the product was washed sequentially with a 5% aqueous sodium hydroxide solution, warm water, a 5% aqueous hydrochloric acid solution and warm water in this order. This operation was repeated twice and the product was dried.

Subsequently, the dried product was dissolved in a small amount of concentrated sulfuric acid and poured into water to precipitate. The precipitated product was washed with water, collected and dried. As the yield of copper phthalocyanine purified in this manner was obtained, it was confirmed to be 35.4%.

Example 3

Phthalonitrile (2.30 g) and 0.90 g of cuprous chloride were mixed with 40 g of ethanol and placed in a Teflon (registered trademark) cylindrical container and closed tight. The mixture was allowed to react in a molten salt bath for one hour at a temperature of 523.15K and a pressure of 6.2 MPa. In other words, the reaction was performed under the supercritical state of ethanol.

After completion of the reaction, a product was collected by filtration and evaluated by powder X-ray diffractometry. As a result, it was confirmed that copper phthalocyanine was synthesized.

After washed with benzene in an amount of about 10 times larger than the weight of product and dried, the product was washed sequentially with a 5% aqueous sodium hydroxide solution, warm water, a 5% aqueous hydrochloric acid solution and warm water in this order. This operation was repeated twice and the product was dried.

Subsequently, the dried product was dissolved in a small amount of concentrated sulfuric acid and poured into water to precipitate. The precipitated product was washed with water, collected and dried. As the yield of copper phthalocyanine purified in this manner was obtained, it was confirmed to be 62.3%.

Example 4

Phthalonitrile (2.30 g) and 1.85 g of titanium tetrachloride were mixed with 40 g of ethanol and placed in a Teflon (registered trademark) cylindrical container and closed tight. The mixture was allowed to react in a molten salt bath for one hour at a temperature of 523.15K and a pressure of 6.2 MPa. In other words, the reaction was performed under the supercritical state of ethanol.

After completion of the reaction, a product was collected by filtration and evaluated by powder X-ray diffractometry. As a result, it was confirmed that titanyl phthalocyanine was synthesized.

After washed with benzene in an amount of about 10 times larger than the weight of product and dried, the product was washed sequentially with a 5% aqueous sodium hydroxide solution, warm water, a 5% aqueous hydrochloric acid solution and warm water in this order. This operation was repeated twice and the product was dried.

Subsequently, the dried product was dissolved in a small amount of concentrated sulfuric acid and poured into water to precipitate. The precipitated product was washed with water, collected and dried. As the yield of titanyl phthalocyanine purified in this manner was confirmed to be about 60%.

Comparative Example 1

Phthalonitrile (2.30 g) and 0.90 g of cuprous chloride were mixed with 90 g of an alkylbenzene and placed in a Teflon (registered trademark) cylindrical container and closed tight. The mixture was allowed to react in a molten salt bath for one hour at a temperature of 473.15K. In other words, the reaction was performed at not more than the boiling point of the alkylbenzene.

After completion of the reaction, a product was collected by filtration and evaluated by powder X-ray diffractometry. As a result, it was confirmed that copper phthalocyanine was synthesized.

After washed with benzene in an amount of about 10 times larger than the weight of product and dried, the product was washed sequentially with a 5% aqueous sodium hydroxide solution, warm water, a 5% aqueous hydrochloric acid solution and warm water in this order. This operation was repeated twice and the product was dried.

Subsequently, the dried product was dissolved in a small amount of concentrated sulfuric acid and poured into water to precipitate. The precipitated product was washed with water, collected and dried. As the yield of copper phthalocyanine purified in this manner was obtained, it was confirmed to be 9.4%.

Comparative Example 2

Phthalonitrile (5.20 g), 1.10 g of cuprous chloride and 35 g of an aqueous ammonia solution were mixed with 200 g of ethylene glycol and placed in a Teflon (registered trademark) cylindrical container and closed tight. The mixture was allowed to react in a molten salt bath for one hour at a temperature of 473.15K. In other words, the reaction was performed at not more than the boiling point of ethylene glycol.

After completion of the reaction, a product was collected by filtration and evaluated by powder X-ray diffractometry. As a result, it was confirmed that copper phthalocyanine was synthesized.

After washed with benzene in an amount of about 10 times larger than the weight of product and dried, the product was washed sequentially with a 5% aqueous sodium hydroxide solution, warm water, a 5% aqueous hydrochloric acid solution and warm water in this order. This operation was repeated twice and the product was dried.

Subsequently, the dried product was dissolved in a small amount of concentrated sulfuric acid and poured into water to precipitate. As the yield of copper phthalocyanine purified in this manner was obtained, it was confirmed to be 2.4%.

From Comparative Examples 1 and 2, and Examples 1 to 4, it was confirmed that when a pigment is synthesized by a method according to the present invention, the yield of a product is greatly improved.

Example 5

Phthalonitrile (2.30 g), 0.90 g of copper chloride and 1.5 g of a styrene-acrylic acid copolymer were mixed with 60 g of ethanol and placed in a Teflon (registered trademark) cylindrical container and closed tight. The mixture was allowed to react in a molten salt bath for one hour at a temperature of 523.15K. In other words, the reaction was performed under the supercritical state of ethanol.

Immediately after completion of the reaction, the reaction solution was dispersed again in an aqueous sodium hydroxide solution prepared at pH 12 and evaluated by Dynamic light scattering photometer, DLS8000 (manufactured by Otsuka Electronics Co., Ltd.). As a result, it was confirmed that fine particles having an average diameter of about 100 nm are produced although aggregates are partially observed. These fine particles were centrifugally collected and then a reaction product was collected by filtration and then evaluated by powder X-ray diffractometry. As a result, it was confirmed that copper phthalocyanine was synthesized.

According to the present invention, a metal phthalocyanine applicable to coloring materials, electrophotograph and other fields can be produced with high yield and in a green process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-015536, filed Jan. 25, 2007, which is hereby incorporated by reference herein in its entirety.

What is claimed is:

1. A method for producing a copper phthalocyanine pigment or titanyl phthalocyanine pigment, the method comprising:

(1) a step of obtaining a mixture by mixing at least one compound selected from the group of phthalonitrile, phthalonitrile derivative, isoindoline derivative and sub-phthalocyanine derivative, and a compound supplying copper or titanium with a solvent; and (2) a step of holding the mixture at not less than a temperature where a subcritical state or a supercritical state of the solvent occurs to obtain the pigment by reacting the compounds.

2. The method for producing a pigment according to claim 1, wherein the solvent is ethanol.

3. The method for producing the pigment according to claim 1, wherein a dispersant to disperse the obtained pigment in the solvent is used in either one of the steps (1) and (2).

4. The method for producing a pigment according to claim 3, wherein the dispersant is a polymer dispersant.

5. The method for producing the pigment according to claim 1, wherein the pigment is synthesized by chemically reacting the compounds with each other.

* * * * *